United States Patent [19]

Perdu

[11] Patent Number: 5,071,093
[45] Date of Patent: Dec. 10, 1991

[54] LIQUID PROPELLANT SUPPLY DEVICE FOR SPACECRAFT ADAPTED TO PREDICT THE END OF ITS SERVICE LIFE

[75] Inventor: Michel Perdu, Frejus, France

[73] Assignee: Aerospatiale Societe Nationale Industrielle, Paris, France

[21] Appl. No.: 629,768

[22] Filed: Dec. 18, 1990

[30] Foreign Application Priority Data

Dec. 22, 1989 [FR] France .................. 89 17128

[51] Int. Cl.⁵ ............................. B64D 37/00
[52] U.S. Cl. ......................... 244/135 R; 244/172; 244/158 R; 137/571; 137/209; 137/558
[58] Field of Search .............. 244/160, 172, 135 R, 244/158 R; 137/571, 209, 558

[56] References Cited

U.S. PATENT DOCUMENTS

| | | |
|---|---|---|
| 3,097,480 | 7/1963 | Sohn .............................. 244/172 |
| 3,389,602 | 6/1968 | Clemens ...................... 244/135 R |
| 3,734,348 | 5/1973 | White ............................. 222/1 |
| 4,609,169 | 9/1986 | Schweickert ................ 244/135 R |
| 4,657,210 | 4/1987 | Hurbert et al. .............. 244/158 R |
| 4,722,183 | 2/1988 | Rosen .......................... 244/172 |

FOREIGN PATENT DOCUMENTS 2537544  6/1984  France .
2635499  2/1990  France .

*Primary Examiner*—Joseph F. Peters, Jr.
*Assistant Examiner*—Christopher P. Ellis
*Attorney, Agent, or Firm*—Browdy and Neimark

[57] ABSTRACT

A liquid propellant supply device for satellites comprises an inlet pipe connected to a source of pressurizing gas, an outlet pipe connected to a propellant distribution manifold and a main storage tank connected at an inlet orifice to the inlet pipe and at an outlet orifice to the outlet pipe. The main storage tank contains a capillary action propellant retention device between the interior of the main storage tank and the outlet pipe. The device further comprises, on the outlet pipe, starting from the main storage tank, a gas test device adapted to detect the presence in the outlet pipe of a significant quantity of gas followed by an auxiliary storage tank substantially smaller than the main storage tank and including a second capillary action propellant retention device separating the interior of the auxiliary storage tank and the distribution manifold.

20 Claims, 6 Drawing Sheets

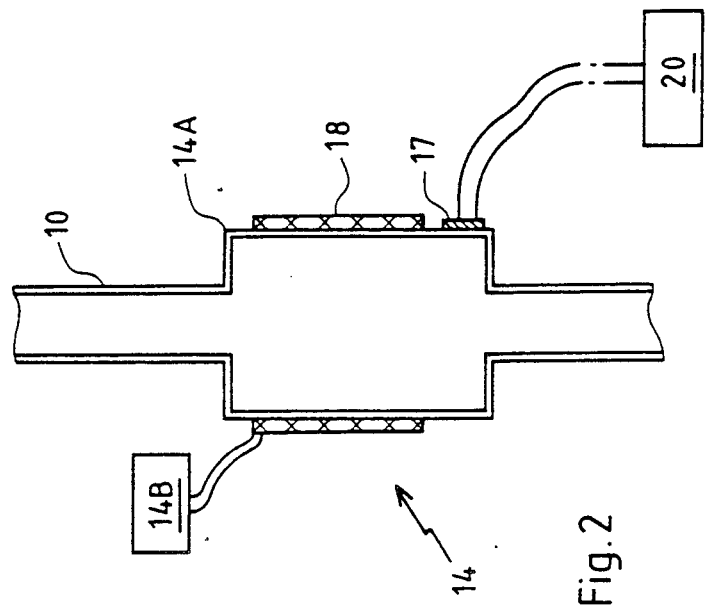
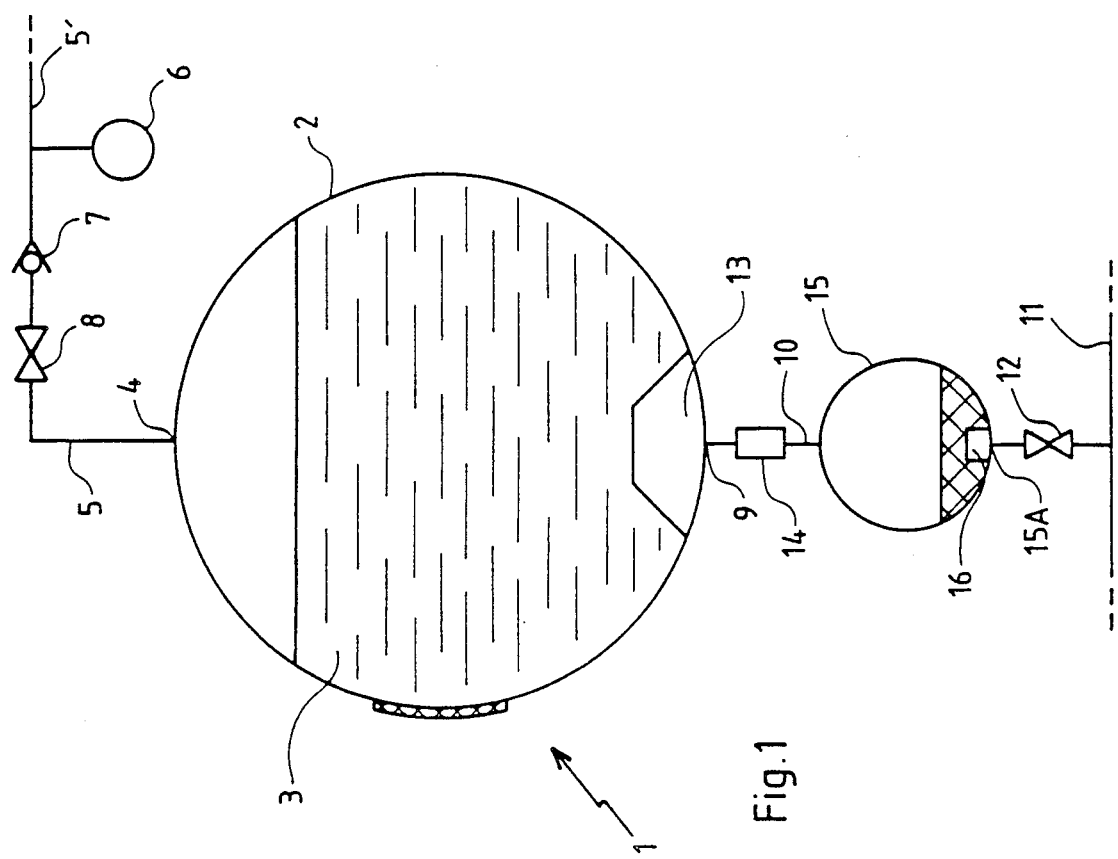

5,071,093

LIQUID PROPELLANT SUPPLY DEVICE FOR SPACECRAFT ADAPTED TO PREDICT THE END OF ITS SERVICE LIFE

BACKGROUND OF THE INVENTION

1. Field of the Invention

The present invention concerns a liquid propellant supply device intended for a satellite and applies in particular to commercial geostationary satellites.

2. Description of the Prior Art

Whatever propulsion system is used for stationkeeping and attitude control of a geostationary satellite, the satellite is no longer usable once the propellant(s) stored in the storage tank(s) of the supply device is/are exhausted.

Numerous devices have been designed to indicate with greater or lesser accuracy: either the remaining volume of propellants in the storage tank(s) at a given time or the time at which the storage tank(s) become empty.

The first category includes all zero or very low gravity volumetric measurement devices and the second includes all devices for detecting gas bubbles at the outlet from the storage tanks.

A third category of end of service life detector devices combines a device from the first or more usually the second category and one or more small additional storage tanks which are just sufficient to remove the satellite from orbit, the additional storage tank(s) being disposed in parallel or in series with the main storage tank(s).

The disadvantages of devices from the first category relate to their complexity, resulting from the need for accuracy, and the disadvantages of devices from the second and third categories relate to the need to detect the very first bubble.

Because the date at which the mission of the satellite ends cannot be predicted before it actually comes about, it is not then possible to implement any measures to continue the mission, for example, to reoptimize a satellite telecommunication network.

An object of the invention is to alleviate the disadvantages associated with these prior art solutions and to enable easy and reliable detection of the approach of complete exhaustion of at least one propellant of the satellite at a time when there remains a predetermined quantity of that propellant.

SUMMARY OF THE INVENTION

To this end the invention proposes a liquid propellant supply device for satellites comprising an inlet pipe connected to a source of pressurizing gas, an outlet pipe connected to a propellant distribution manifold and a main storage tank connected at an inlet orifice to said inlet pipe and at an outlet orifice to said outlet pipe and containing a capillary action propellant retention device between the interior of said main storage tank and said outlet pipe, said device further comprising, on the outlet pipe, starting from the main storage tank, a gas test device adapted to detect the presence in the outlet pipe of a significant quantity of gas followed by an auxiliary storage tank substantially smaller than the main storage tank and including a second capillary action propellant retention device separating the interior of said auxiliary storage tank and the distribution manifold.

The invention thus makes it possible to eliminate the disadvantages associated with the prior art methods, thanks to:

1. a very simple gas detector device which makes it possible to detect that a small test area on the outlet side of the main storage tank(s) of the propulsion system is becoming empty of propellant, 2. an additional or auxiliary storage tank on the outlet side of said test area, providing for six months to one year of operation and then removal of the satellite from orbit after the absence of propellant is detected in said test area. Said additional storage tank in series with the main storage tank(s) includes a self-filling simplified propellant retention device.

The advantages of the device in accordance with the invention relate to the fact that it need only detect the absence of propellants (or at least very large pressurizing gas bubbles), so eliminating the need for complex and heavy onboard electronics dedicated to a device for detecting fine bubbles, as needed in the aforementioned second and third categories.

The advantages of the auxiliary storage tank(s) stem from the fact that during launch and during the circularization of the orbit the auxiliary storage tank(s) are protected from acceleration by the propellant retention device conventionally provided on the main storage tank(s) and consequently the fact that:

a) the capillary retention capacity of the auxiliary storage tank can be just that necessary to withstand accelerations during orbit correction maneuvers, which makes it possible to use a simple capillary action retention device structure;

b) the volume of propellant held by capillary forces in said simplified retention device can be just that necessary to remove the satellite from orbit, including a safety margin.

It must be possible to fill the internal capillary action retention device of the auxiliary storage tank during the longest orbit correction maneuvers (usually North-South maneuvers). For this reason the shape of the auxiliary storage tank(s) is optimized and the storage tank(s) is/are mounted in the satellite in a particular orientation (North-South in practise) and the dimensions are optimized so that the remaining service life after emptying of the main storage tank is detected is as long as possible (six months to one year, for example).

The use and the design of the auxiliary storage tank(s) are therefore radically different from the various devices including storage tanks connected in series such as have been designed previously, for example as disclosed in the patent FR-2.537.544 in which two similar volume main storage tanks are disposed in series, with no intermediate test area, in a configuration requiring flow towards the storage tank nearer the outlet due to the effect of acceleration generated during orbital injection.

According to advantageous features of the invention, possibly combinable:

the gas test device comprises a test area forming part of the outlet pipe provided with a temporary heating element and with a temperature sensor connected to a processor circuit;

said processor circuit includes a comparator adapted to compare the rate of heating of the test area with a reference rate which is between the respective rates of heating in the presence of propellant and in the presence of pressurizing gas;

the test area is an enlarged portion of the outlet pipe around which is wound an electrical resistance;

the auxiliary storage tank has a volume less than 10% of the volume of the main storage tank;

the auxiliary storage tank has a volume between 1 and 5% of the volume of the main storage tank;

the second capillary action propellant retention device has a propellant capacity at least equal to the quantity of propellant needed to remove the satellite from orbit;

the capacity of said second propellant retention device is substantially between 0.5 and 3 liters;

it further comprises, between the main storage tank and the auxiliary storage tank, a non-return device for the propellant;

said non-return device is a capillary action device;

said non-return device is disposed between the test device and the auxiliary storage tank;

a heater is mounted on the main storage tank;

the main storage tank comprises at least two main storage tanks disposed in parallel between the inlet pipe and the outlet pipe;

an additional storage tank is mounted in the inlet pipe communicating with the interior of the main storage tank via a capillary action phase separator only;

said additional storage tank is equipped with a heater;

it comprises, for a second propellant, a second inlet pipe, a second outlet pipe connected to a second propellant distribution manifold, and a second main storage tank disposed between said second inlet and outlet pipes;

a second gas test device and a second auxiliary storage tank are provided on the second outlet pipe;

the second main storage tank is in free and direct communication with the second propellant distribution manifold;

the auxiliary storage tank is so disposed that its inlet and outlet orifices are aligned in a predetermined maximum acceleration direction;

said auxiliary storage tank is disposed parallel to the North-South axis of the satellite.

Objects, features and advantages of the invention will emerge from the following description given by way of non-limiting example with reference to the appended drawings.

BRIEF DESCRIPTION OF THE DRAWINGS

FIG. 1 is a schematic representation of a propellant supply device in accordance with the invention.

FIG. 2 is a detail view of the test device from FIG. 1 with its processor circuit.

DETAILED DESCRIPTION OF THE INVENTION

Figure 3:
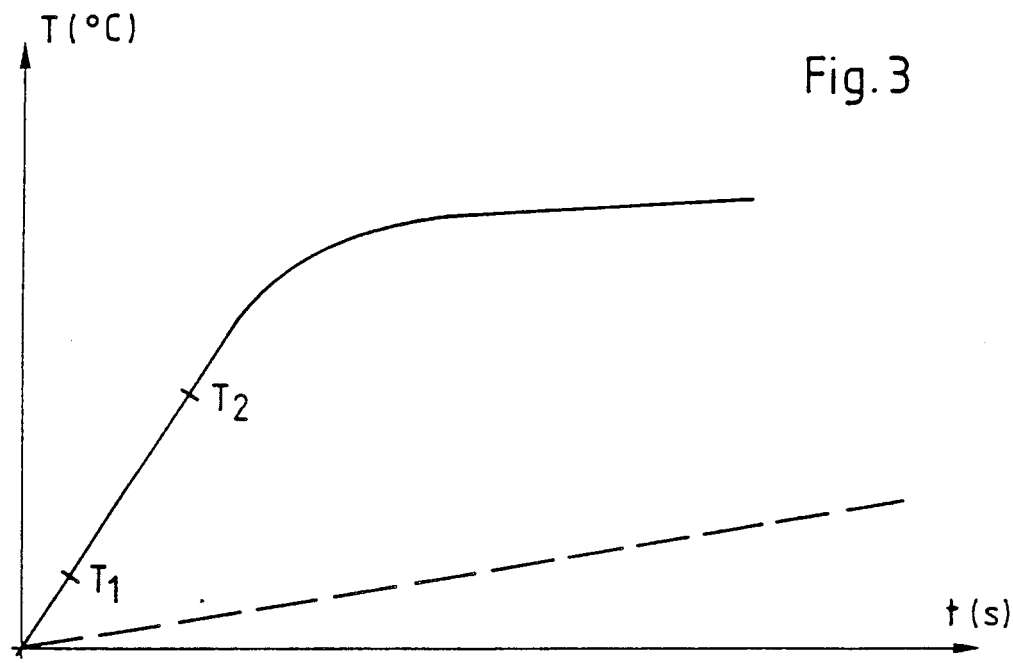
FIG. 3 is a graph on which the operation of said test device is founded.

The propellant supply device 1 shown in FIG. 1 is designed to contain one of the liquid propellants needed to inject a satellite into its orbit (see FIG. 13) and subsequently for stationkeeping and attitude collection. This system is therefore a so-called "unified" propulsion system. The liquid propellants used are usually nitrogen peroxide ($N_2O_4$) and monomethylhydrazine (MMH).

The supply device 1 includes a main storage tank 2 designed to contain, at launch, most of the propellant 3 in question. In an alternative embodiment shown in FIGS. 10 and 11, the supply device is formed by two main storage tanks 2A and 2B disposed in parallel.

The storage tank 2 has an inlet orifice 4 connected by an inlet pipe 5 to a source 6 of pressurizing gas, such as a storage tank of helium at a very high pressure (a few hundred bars), followed by pressure regulator (not shown). A non-return device 7 and a valve 8 are provided in said inlet pipe. The source 6 of pressurizing gas may in practise be common to two propellant supply devices (see also FIGS. 10 and 11), being connected to another inlet pipe 5'.

The storage tank 2 also has an outlet orifice 9 connected to an outlet pipe 10 leading to a distribution manifold 11 connected to the apogee motor and to various thrusters (not shown) included in the propulsion system of the satellite. The outlet pipe 10 is provided with a valve 12.

In the conventional way, the storage tank contains a capillary action propellant retention device 13 connected to the outlet orifice.

The arrangements described above are conventional.

According to the invention, the supply device 1 includes in its outlet pipe a small volume test device 14 followed by an auxiliary storage tank 15 significantly smaller than the main storage tank and provided at its outlet 15A with a simplified capillary action propellant retention device 16.

The test device 14 is in fact a gas detector. It is in the form of a test area 14A through which the fluid flowing from the main storage tank 2 to the auxiliary storage tank 15 flows, equipped with a thermal action electrical measuring device 17 the output from which is significantly different according to whether the fluid is a liquid or a gas.

Referring to FIG. 2, the test area 14A is a wider section of the outlet pipe 10 surrounded by a heating resistance 18 energized temporarily and cyclically by a control circuit 14B (in practise with a low power rating, typically in the order of 0.1W); the electrical measuring device is a temperature sensor mounted on said widened section and the measurement signal from it is applied to a processor circuit 20.

As an alternative to this (not shown), the test device may comprise a thermistor or a thermocouple.

The output signal from the measurement device is in practise a voltage V.

Figure 4:
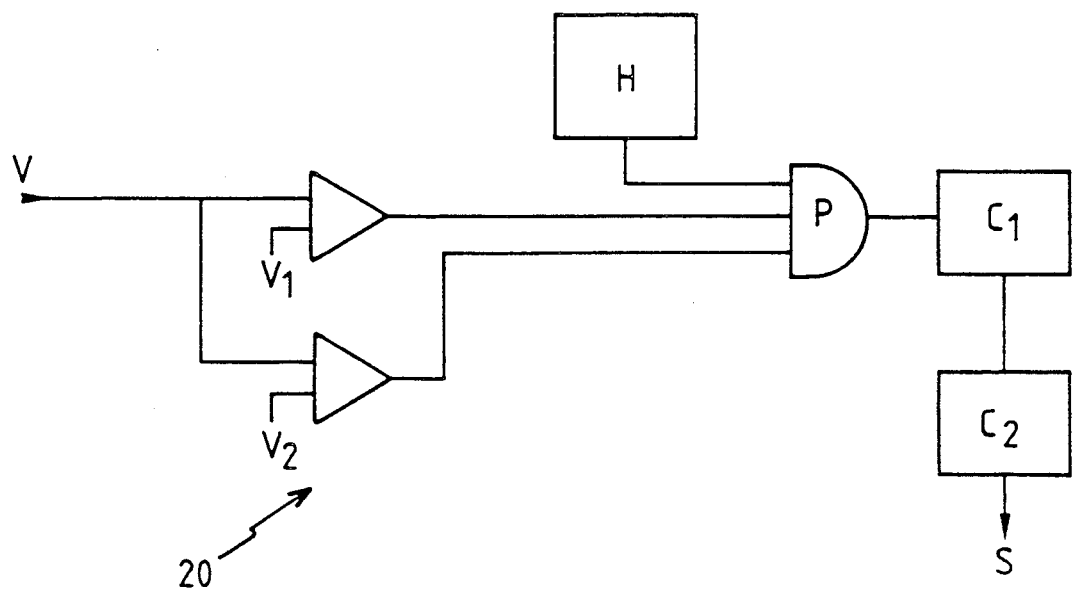
FIG. 4 is a block diagram of the processor circuit from FIG. 2.

FIG. 4 shows one embodiment of the onboard processor circuit from FIG. 2.

The graph in FIG. 3 is plotted from simple calculations that will be familiar to those skilled in the art. It shows the effect of the difference in heat capacity between a liquid (dashed line) and a gas (full line) when the test area is heated, as reflected in a different rate of increase in temperature. The temperature increase for a liquid is much lower than that for a gas.

Taking two reference values $T_1$ and $T_2$ (in practise the corresponding voltages $V_1$ and $V_2$), it is possible, using the circuit from FIG. 4, to obtain an output signal F which is transmitted by the satellite indicating the presence or absence of gas in the test area; the measured instantaneous voltage V is compared with reference values $V_1$ and $V_2$.

Immediately $V_1$ is reached, the logic gate P passes pulses from the clock H. The pulses are accumulated in the counter $C_1$ and compared with an (experimentally chosen) reference value in the comparator $C_2$.

Immediately $V_2$ is reached, the logic gate P is disabled and the counter $C_1$ is no longer incremented. The comparator $C_2$ gives a non-null signal S only if the reference value has not been exceeded ("fast" temperature rise characterizing a gas; otherwise the temperature rise is "slow" which indicates that liquid is still flowing).

Figure 5:
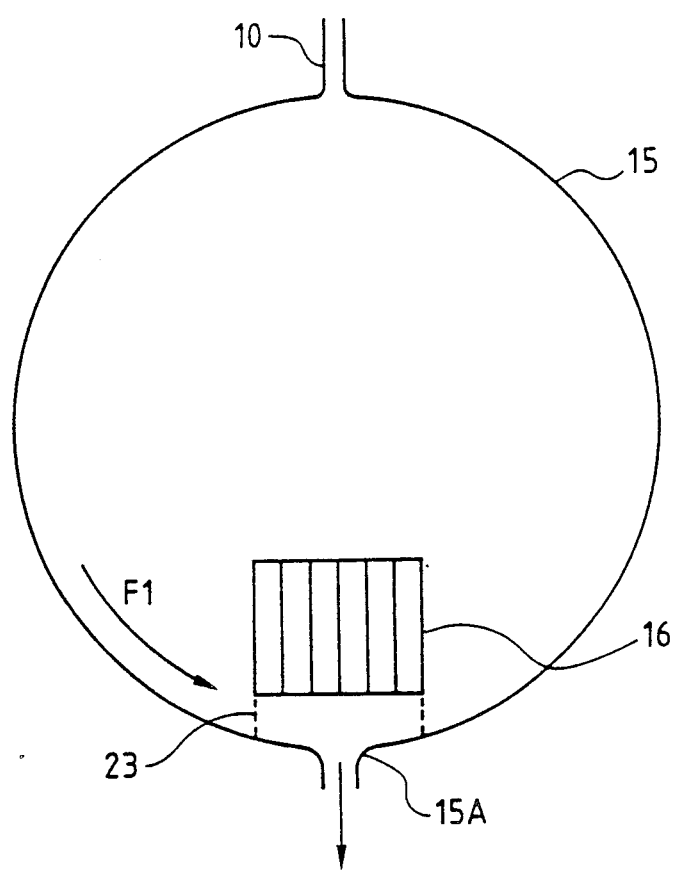
FIG. 5 is a view to larger scale of the auxiliary storage tank from FIG. 1 with its simplified retention device.
Figure 6:
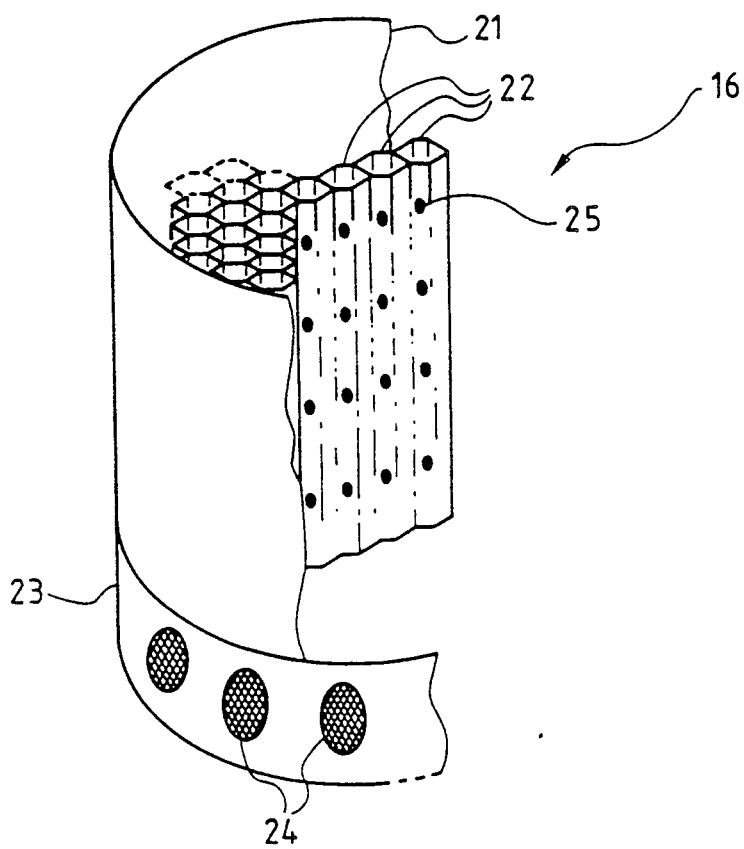
FIG. 6 is a partial view to a larger scale of said simplified retention device.

The self-filling propellant retention device 16 shown in FIGS. 5 and 6 is adapted, due to the effect of inertia forces operative during orbit correction maneuvers, to allow propellant to enter the part having capillary action retention properties and to remain there (an electrical analogy for this function would be represented by a diode followed by a capacitor). The bubble point of this device is in practise fairly low, typically in the order of 1 mbar.

A capillary action retention device with a higher bubble point could instead be used, occupying the major part of the auxiliary storage tank, so as to depend no longer on accelerations resulting from specific maneuvers.

As shown in FIG. 6, the device comprises, for example, a cylinder 21 containing hexagonal metal tubes 22 the cross-section of which is determined to achieve the necessary capillary action retention.

Figure 13:
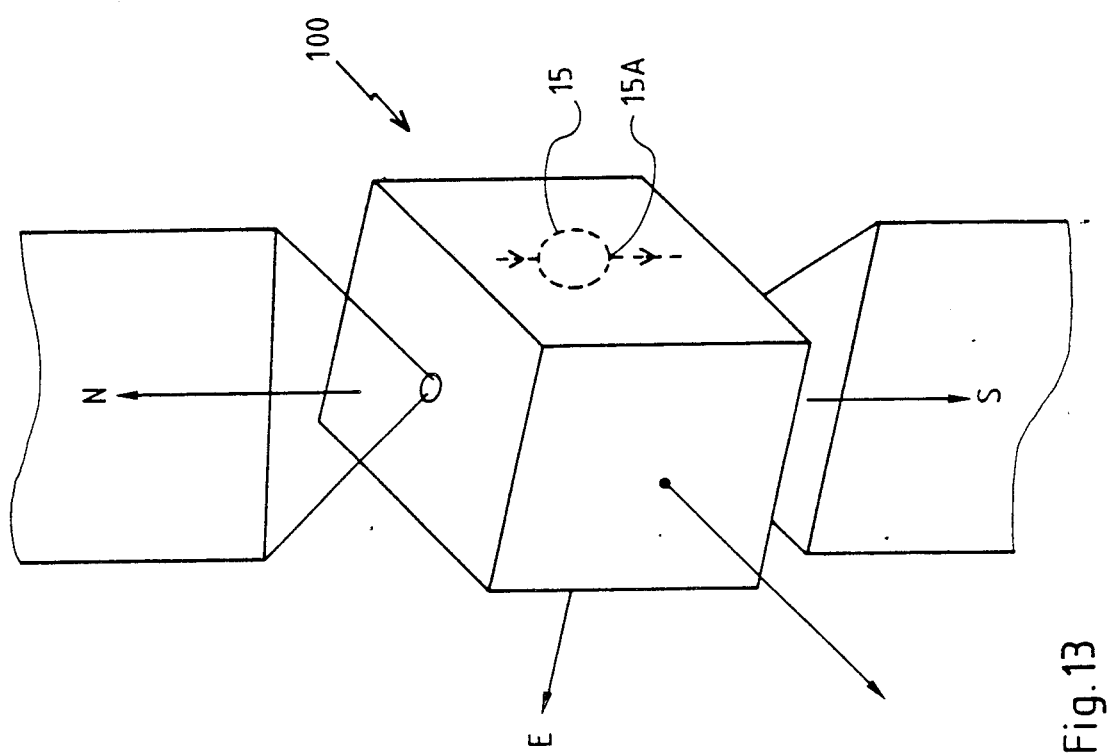
FIG. 13 is a schematic showing the location of the auxiliary storage tank from FIG. 1 in an orbiting attitude-stabilized satellite.

Said cylinder 21 is fixed into the auxiliary storage tank on the side 15A from which the propellants are expelled and the axis of the cylinder is oriented in the mean direction accelerations created during orbit correction maneuvers (North-South—see FIG. 13—or East-West).

The cylinder is fixed by means of a base 23 which is made permeable to the propellants by grills 24 but which has a capillary retention capacity ("bubble point") higher than that of the cylinder:

the permeability to the propellants contributes to the self-filling function for the propellant moving down the walls (arrow F1) during orbit correction maneuvers, the fact that the capillary retention capacity is higher than that of the cylinder ensures that the volume defined by the cylinder and by its base is emptied beginning with the cylinder.

For the cylinder 21 to be emptied homogeneously, apertures 25 are provided inside the cylinder to enable the propellant to pass from one tube to another.

The capacity of said device 16 is in practise that which is sufficient to remove the satellite from orbit at the end of its service life.

Figure 8:
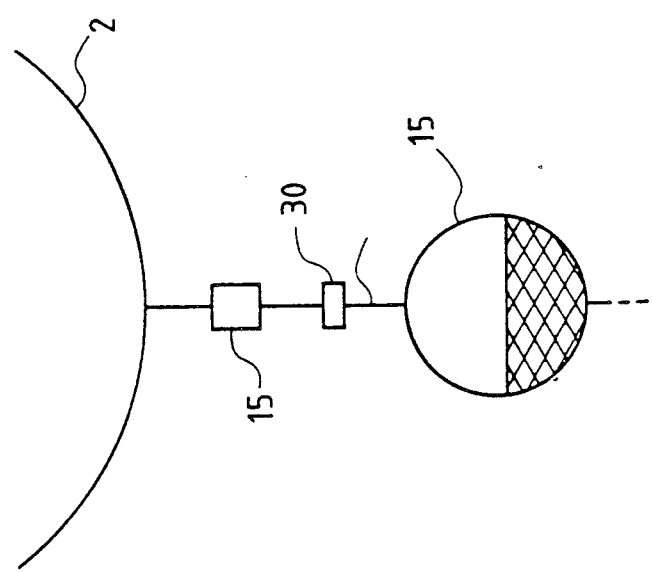
FIG. 8 is a further embodiment of said device.
Figure 7:
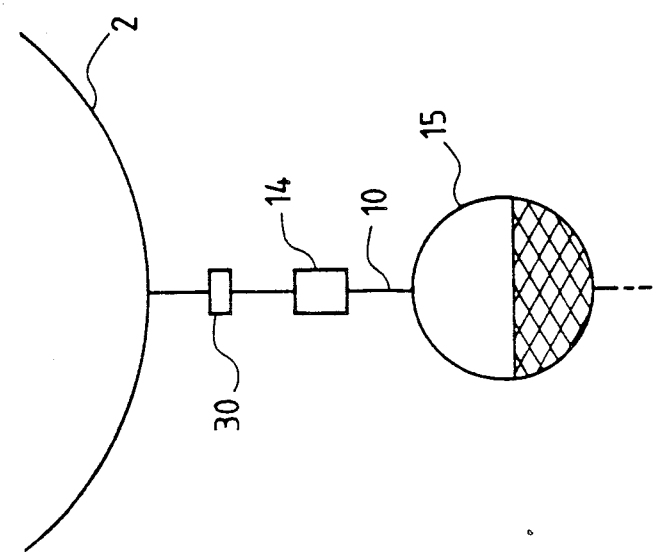
FIG. 7 is a partial schematic view of an alternative embodiment of the device from FIG. 1.

FIGS. 7 and 8 show alternative embodiments of the device from FIG. 1 in which a non-return device 30 is provided between the main storage tank and the auxiliary storage tank on the inlet side (FIG. 7) or on the outlet side (FIG. 8) of the test area.

Figure 9:
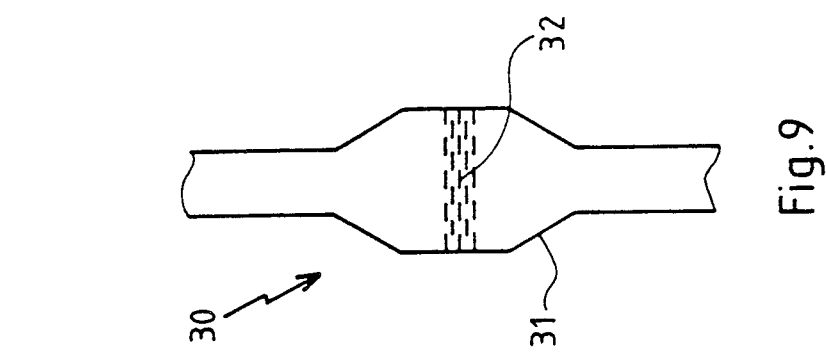
FIG. 9 is a detail view of the propellant non-return device from FIGS. 8 and 9.

As shown in FIG. 9, the non-return device is a capillary action device: it is in the form of a widened body 31 across which one or more fine-mesh grills 32 are disposed, the mesh size of the grill being adapted to provide the necessary barrier effect against reverse flow.

As an alternative to this, said non-return device may be a mechanical device (conventional non-return valve) or an electromechanical device (valve, etc).

Figure 10:
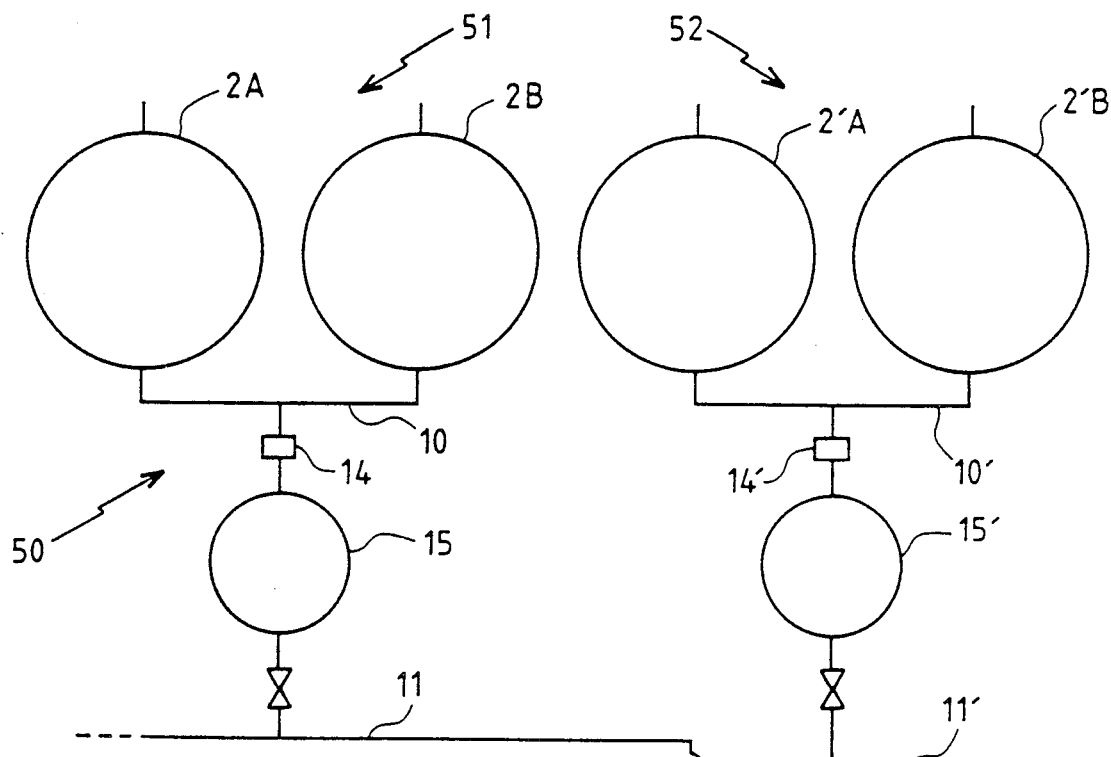
FIG. 10 is a schematic showing a first embodiment of a two-propellant supply device.

FIG. 10 shows a two-propellant supply device 50 comprising two parallel branches 51 and 52 each dedicated to a respective propellant, and each of which is similar except that it has two main storage tanks) to the single-propellant device from FIG. 1 (one of the branches uses the same reference numbers as FIG. 1; the same reference numbers "primed" are used for the other branch).

Figure 11:
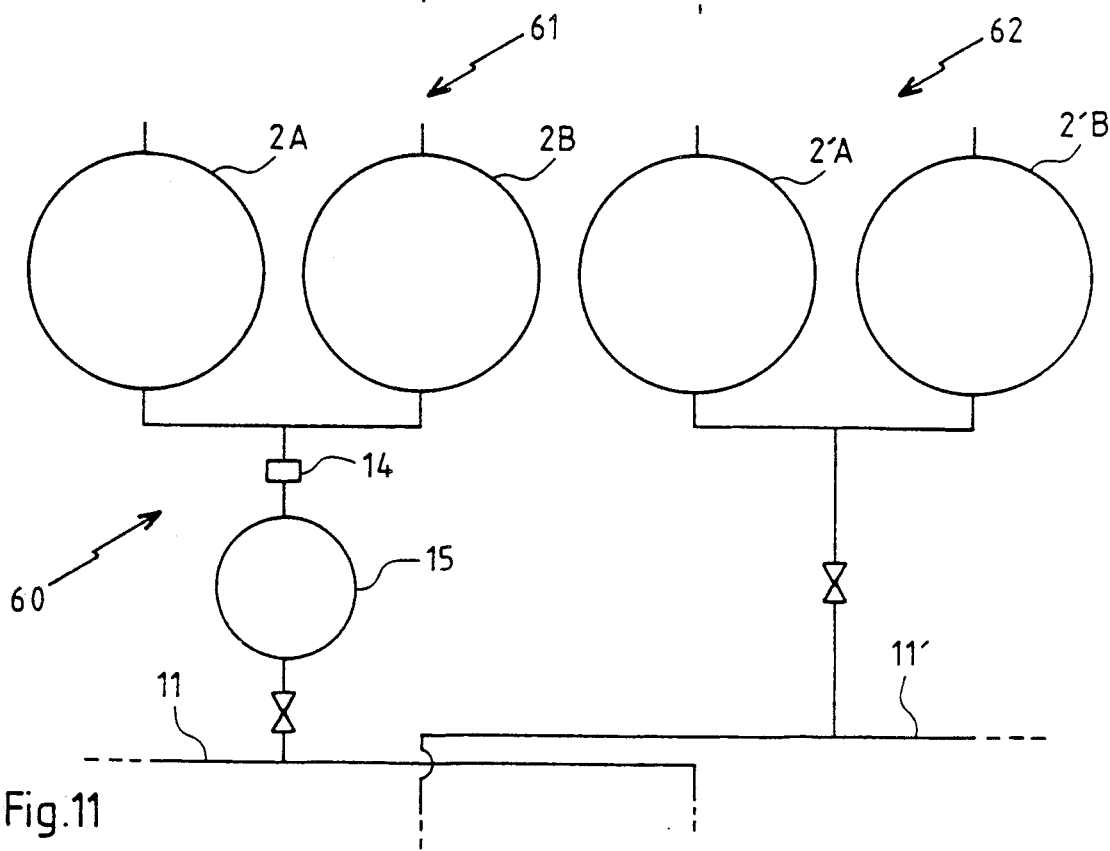
FIG. 11 is an analogous view of a second embodiment.

FIG. 11 shows a two-propellant supply device 60 in which only one branch 61 is in accordance with the invention, the other branch 62 having a conventional structure.

Figure 12:
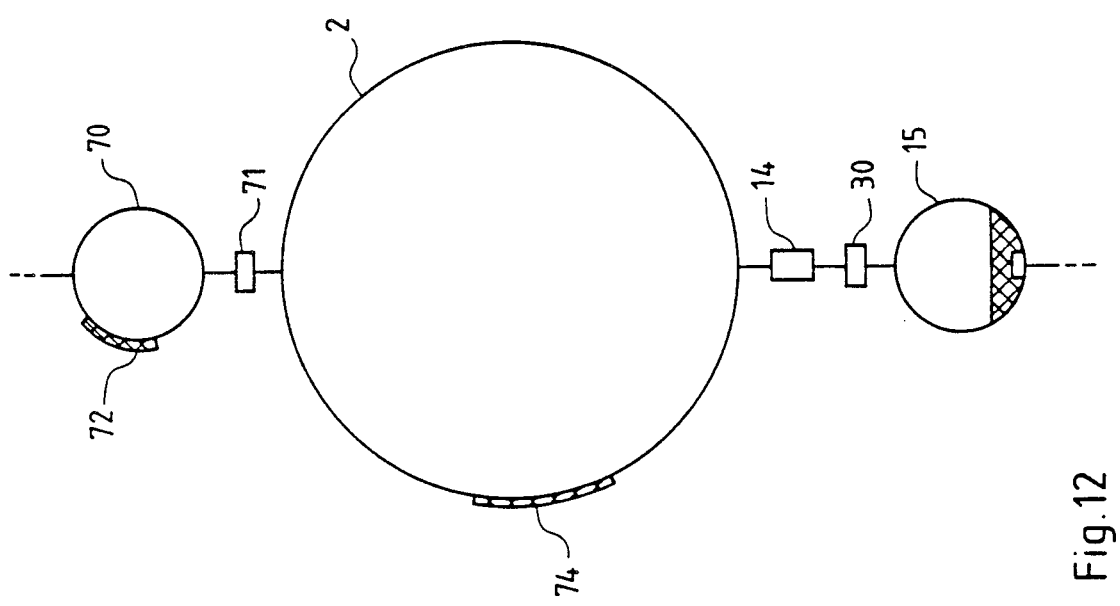
FIG. 12 is a schematic showing an alternative embodiment of the device from FIG. 1.

The device of FIG. 12 differs from that of FIG. 1 by virtue of the fact that there has been added in series with and on the inlet side of the main storage tank a device for augmenting the volume reserved for the pressurizing gas and consisting of:

an additional storage tank 70 with no propellant retention device (its volume is, for example, between 2% and 5% of the volume of the main storage tank);

a capillary action phase separator 71 disposed between the additional storage tank and the main storage tank (the object is to avoid reverse flow of propellant towards the inlet).

Furthermore, a heater 72 has been added to the additional storage tank to maintain it at a temperature slightly higher than that of the main storage tank. The latter may also be equipped with a heater 74, however, which makes it possible, by operating on the temperature and therefore the pressure inside the main storage tanks, to prevent the propellant returning from the auxiliary storage tank to the main storage tank.

FIG. 13 is a partial representation of a satellite body 100, an auxiliary storage tank 15 of which is shown in dashed outline. It is oriented along the North-South axis along which the greater accelerations (higher than those along the East-West axis) are applied during stationkeeping and attitude correction maneuvers. This enables improved filling of the end of service life propellant retention device 16 during orbital maneuvers.

The invention may be applied to satellites of the TV-SAT/TDF1 and EUTELSAT II families in particular.

To give a numerical example, the capacity of the main storage tank(s) is approximately 1 000 l, the auxiliary storage tank has a capacity of approximately 20 l (less than 10% of the main storage tank capacity) and the device 16 has a capacity of approximately 1 l (less than 10% of the auxiliary storage tank capacity); the additional storage tank has a capacity of 4 l, for example.

In practise, most of the available propellant remains in the main storage tank during the major part of the life of the satellite in orbit. When the gas test device 14 detects the presence of a significant quantity of gas in the test area, the volume of propellant contained in the auxiliary storage tank provides for a predetermined residual life followed by removal from orbit. During this residual life the propellant retention device of the auxiliary storage tank is successively filled during each North-South maneuver with sufficient propellant for any fine correction maneuvers that might need to be applied before the next North-South maneuver generating sufficient acceleration to refill the self-filling retention device.

Those skilled in the art will be able to determine the number and the shape of the main storage tanks, according to the available space.

The materials from which the auxiliary storage tank and the non-return device 30 are made must be as light as possible and mechanically and chemically compatible with the applied forces and chemical attack by the propellant in question. They are conventionally stainless steel or platinum alloy or appropriate known synthetic materials.

The temperatures $T_1$ and $T_2$ are equal to 30° C. and 45° C. and the reference rate for distinguishing between absence and presence of propellant in the test area is chosen as equal to 0.6° C./s, for example.

The frequency with which the gas test device is activated is in practise the frequency of the North-South orbit correction maneuvers.

It goes without saying that the foregoing description has been given by way of non-limiting example only and that numerous variants can be put forward by those skilled in the art without departing from the scope of the invention. In particular, there may be two or more additional storage tanks disposed in series. Similarly, the outlet pipe may be duplicated, with two test devices, in the case of a main storage tank comprising two storage tanks in parallel, for example.

There is claimed:

1. Liquid propellant supply device for satellites comprising an inlet pipe connected to a source of pressurizing gas, an outlet pipe connected to a propellant distribution manifold and a main storage tank connected at an inlet orifice to said inlet pipe and at an outlet orifice to said outlet pipe and containing a capillary action propellant retention device between the interior of said main storage tank and said outlet pipe, said device further comprising, on said outlet pipe, starting from the main storage tank, a gas test device adapted to detect the presence in the outlet pipe of a significant quantity of gas followed by an auxiliary storage tank substantially smaller than said main storage tank and including a second capillary action propellant retention device separating the interior of said auxiliary storage tank and said distribution manifold.

2. Device according to claim 1 wherein said gas test device comprises a test area forming part of said outlet pipe provided with a temporary heating element and with a temperature sensor connected to a processor circuit.

3. Device according to claim 2 wherein said processor circuit includes a comparator adapted to compare the rate of heating of said test area with a reference rate which is between the respective rates of heating in the presence of propellant and in the presence of pressurizing gas.

4. Device according to claim 2 wherein said test area is an enlarged portion of said outlet pipe around which is wound an electrical resistance.

5. Device according to claim 1 wherein said auxiliary storage tank has a volume less than 10% of the volume of said main storage tank.

6. Device according to claim 5 wherein said auxiliary storage tank has a volume between 1 and 5% of the volume of said main storage tank.

7. Device according to claim 1 wherein said second capillary action propellant retention device has a propellant capacity at least equal to the quantity of propellant needed to remove the satellite from orbit.

8. Device according to claim 7 wherein the capacity of said second propellant retention device is substantially between 0.5 and 3 liters.

9. Device according to claim 1 further comprising between said main storage tank and said auxiliary storage tank a non-return device for the propellant.

10. Device according to claim 9 wherein said non-return device is a capillary action device.

11. Device according to claim 9 wherein said non-return device is disposed between said test device and said auxiliary storage tank.

12. Device according to claim 1 wherein a heater is mounted on said main storage tank.

13. Device according to claim 1 wherein said main storage tank comprises at least two main storage tanks disposed in parallel between said inlet pipe and said outlet pipe.

14. Device according to claim 1 wherein an additional storage tank is mounted in said inlet pipe communicating with the interior of the main storage tank via a capillary action phase separator only.

15. Device according to claim 14 wherein said additional storage tank is equipped with a heater.

16. Device according to claim 1 further comprising, for a second propellant, a second inlet pipe, a second outlet pipe connected to a second propellant distribution manifold and a second main storage tank disposed between said second inlet and outlet pipes.

17. Device according to claim 16 wherein a second gas test device and a second auxiliary storage tank are provided on said second outlet pipe.

18. Device according to claim 16 wherein said second main storage tank is in free and direct communication with said second propellant distribution manifold.

19. Device according to claim 1 wherein said auxiliary storage tank is so disposed that its inlet and outlet orifices are aligned in a predetermined maximum acceleration direction.

20. Device according to claim 19 wherein said auxiliary storage tank is disposed parallel to the North-South axis of the satellite.

* * * * *